United States Patent

[11] 3,556,244

| | | | | |
|---|---|---|---|---|
| [72] | Inventor | George W. Gray<br>Lambertville, N.J. |
| [21] | Appl. No. | 713,473 |
| [22] | Filed | Mar. 15, 1968 |
| [45] | Patented | Jan. 19, 1971 |
| [73] | Assignee | RCA Corporation<br>a corporation of Delaware |

[54] VEHICLE ROAD GUIDANCE SYSTEM
3 Claims, 1 Drawing Fig.

[52] U.S. Cl. ................................................ 180/98,
180/79; 318/18
[51] Int. Cl. ............................................. B62d 1/24,
B62d 5/04, B62d 9/00
[50] Field of Search .................................. 180/82(E),
79.1, 98, 79; 318/18

[56] References Cited
UNITED STATES PATENTS
| | | | |
|---|---|---|---|
| 2,847,080 | 8/1958 | Zworykin et al. | 180/79.1X |
| 2,859,426 | 11/1958 | Davis | 180/82(E)UX |
| 3,132,710 | 5/1964 | Petrella et al. | 180/82(E)X |

*Primary Examiner*—A. Harry Levy
*Attorney*—Edward J. Norton

ABSTRACT: A vehicle road guidance system in which two guide conductors are provided along a road and the distance between them is monitored by the vehicle to control the steering mechanism of the vehicle.

PATENTED JAN 19 1971
3,556,244
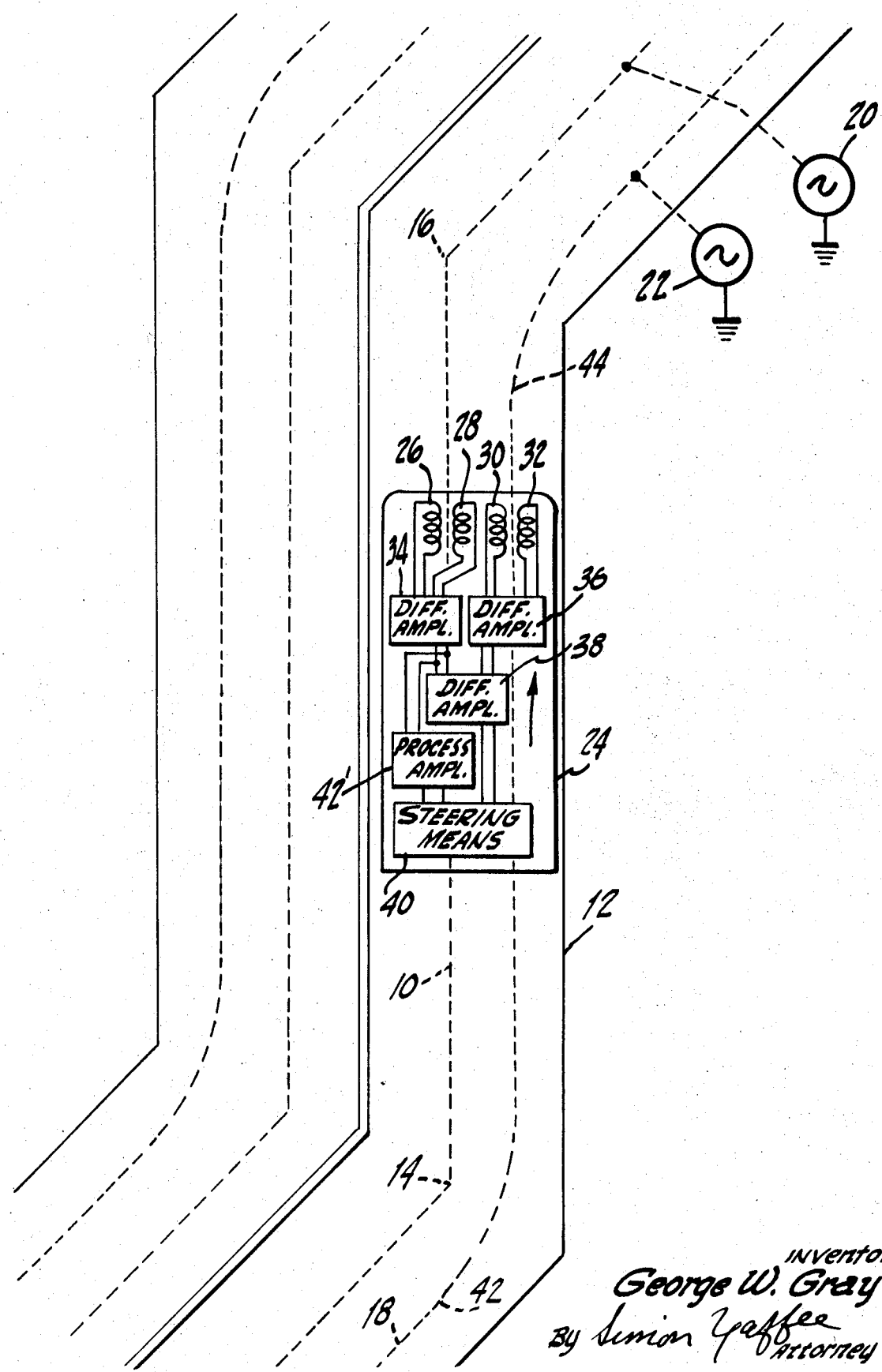
INVENTOR
George W. Gray
By Simon Yaffee
Attorney

VEHICLE ROAD GUIDANCE SYSTEM

BACKGROUND

Vehicle-steering systems are known in which a guide means such as a conductor or wire extends along the vehicle path. A wave of a predetermined frequency is applied to the wire and a pair of pickup devices are provided on the vehicle. These pickup devices control the vehicle steering apparatus in such a manner that the vehicle takes a path such that the pickup devices are and remain equally spaced on opposite sides of the guide wire as the road curves. In such a vehicle guidance system, the turn in the road is not sensed until the vehicle has arrived at the turn, and therefore changes in direction of the vehicle are more abrupt than changes of direction of a vehicle driven by a human driver. This is due to the fact that the guidance wire follows the path and turns when it does, whereby the turns as made by the vehicle controlled by the guidance wire are sudden and excessive when the path turns, followed by a sudden and excessive correction when the path straightens out. However, a human driver by looking ahead caN anticipate a change in the direction of the path and guide the vehicle smoothly along a curved path.

It is an object of this invention to provide an improved vehicle guidance system.

It is further object of this invention to provide a vehicle guidance system which provides means for anticipating the change in direction of a path for guiding a vehicle along the curved path in a smooth manner.

SUMMARY

In accordance with the invention, a pair of guiding conductors or wires are provided along the path. One thereof, which may be called the guide wire, extends along the path. The other wire, which may be called the turn wire, extends at a distance from the guide wire which is related to the curvature of the path. Along straight stretches of the path, the distance between the wires is equal to a predetermined value. Along curved portions of the path and on the portion of the path approaching and receding from the curved portions of the path, the distances between the wires is such that a properly equipped vehicle traveling along the path will be steered smoothly therealong. For example, a decrease of the distance between the wires would result in the vehicle being steered to the left (for example) and an increase in the distance between the wires would result in the vehicle being steered to the right. In each case, the greater the difference between the actual distance between the wires and the predetermined value of that distance, the correspondingly sharper turning of the vehicle results. Furthermore, the distance between the turn wire and the guide wire changes in a manner to anticipate changes in direction of the path, whereby steering of the vehicle controlled by the guide wire and the turn wire will be smooth.

Also, vehicle-steering means which are sensitive to the distance between the guide and turn wires are provided on a vehicle to steer the vehicle along a path way provided with guide and turn wires.

DESCRIPTION

The invention will be better understood upon reading the following description in connection with the accompanying drawing, the single FIG. of which illustrates an embodiment of this invention.

A guide wire 10 runs along a roadway 12, this wire 10 being shown in dotted lines since it is usually buried beneath the road 12. The wire 10 turns left as at 14 and then turns right at 16 along the length thereof at corresponding turns in the road 12. A turn wire 18, which may also be buried under the road 12, runs substantially parallel to the guide wire 10, and, along straight stretches of the road 12, the wires 10 and 18 are positioned at a predetermined constant distance from each other. However, as the left turn at 14 in the road 12 is approached, the wire 18 begins to approach the wire 10 at a point 42 before arriving at the left turn 14 in the path. At the left turn at 14, the wires 10 and 18 are at their nearest distance and then the distance between the wires 10 and 18 returns to the same distance as at other straight stretches of the road 10. Similarly, as the right turn at 16 in the road 12 is approached, the wire 18 begins to recede from the wire 10 as at point 44. At the right turn 16, the wires 10 and 18 are at their greatest distance from each other and then the distance between the wires 10 and 18 is gradually returned to the same distance as at other straight stretches of the road 12. A wave of one frequency is applied to the wire 10 and a wave of a different frequency is applied to the wire 18 by respective sources 20 and 22.

A vehicle 24 that is equipped to be guided by the guide wires 10 and 18 may carry two pairs of two pickup means such as coils 26, 28, 30 and 32. The coils 26 and 28 comprise one pair thereof and these coils are connected to the input of a differential amplifier 34. Coils 30 and 32 comprise the other pair thereof and they are coupled to a differential amplifier 36. The output of the differential amplifier 34 and of the differential amplifier 36 are applied to a differential amplifier or comparer circuit 38. The output of the differential amplifier 38 goes to steering control equipment or mechanism 40 of the vehicle. For convenience, the steering control mechanism 40 is shown as being at the back of the vehicle 24. The coils 26 and 28 are so positioned on the vehicle 24 that when the vehicle 24 is being guided by the wires 10 and 18, the coils 26 and 28 will be in the vicinity of the guide wire 10 and preferably on opposite sides thereof. The differential amplifier 34 is sensitive only to the frequency applied to the wire 10, and therefore the output of the differential amplifier varies up and down as the vehicle travels to the right or the left of the position where the coils 26 and 28 embrace the the wire 10. The coils 30 and 32 are positioned to embrace the turn wire 18 when the coils 26 and 28 embrace the guide wire 10 and also when the distance between the wires 10 and 18 is equal to the distance corresponding to a straight stretch of a road 12. The differential amplifier 36, which is sensitive only to the frequency applied to the guide wire 18, provides an output which is at a halfway value when the wire 18 is exactly between the coils 30 and 32, and a greater or lesser value when the coils 30 and 32 (as at or near a turn 14 or 16) are more or less completely to the right or left of the wire 18. The output of the differential amplifier 36 is compared with the output of the differential amplifier 34 in the differential amplifier 38, and the output voltage of the differential amplifier 38 determines the angular position of the front wheels (not shown) of the vehicle 20 as controlled by the steering control apparatus 40 in such a manner that the wheels of the vehicle 24 are pointed at a maximum left angle with respect to the center line of the vehicle for the minimum distance between the wires 10 and 18, at a maximum right angle with respect to the center line of the vehicle for the maximum distance between the wires 10 and 18, and directly ahead for a predetermined intermediate distance between the wires 10 and 18, the direction of the vehicle wheels varying proportionately with the distance between the wires 10 and 18.

It will be noted that the distance between the conductors 10 and 18 begins to vary from the predetermined distance at a position 42 along the line 18 which is reached by a vehicle 24 before the curve of the road at 14 is reached. Since the distance between the wires 10 and 18 becomes smaller as the turn at 14 is approached, the coil 30 will pick up more signal from the line 18 than the coil 32, and the differential amplifier 38 will apply a signal to the steering mechanism 40 to cause the front wheels of the vehicle to steer to the left. For each different distance between the conductors 10 and 18, there is a corresponding different angular position of the steering wheels of the vehicle. Therefore, the vehicle starts turning to the left as the vehicle approaches the turn 14 and turns back to steering straight ahead after the vehicle passes the turn 14. Since the departure of the distance between the wires 10 and 18 from the distance corresponding to straight line travel of the vehicle is a smooth gradual departure, the change of direction of the vehicle is gradual and smooth. Since the beginning of the approach of the line 18 to the line 10 is before the turn 14, the steering of the vehicle 24 anticipates the turn at 14, whereby smooth steering results.

In a similar manner, the vehicle 24 starts turning right in a smooth and gradual manner at point 44, when the 10 and 18 begin to increase their separation, which is before the turn of the roadway at 16, and starts turning back in a smooth and gradual manner at the turn 16 when the wires 10 and 18 start to approach each other, whereby the vehicle-steering mechanism again anticipates the turn in the roadway 12.

If the steering of the vehicle 24 is so set that the vehicle should go straight ahead, and if it wanders a little from its straight ahead travel, the described vehicle roadway will not apply proper steering corrections. This is due to the fact that as the car wanders to the left, for example, pick up from both right-hand coils 28 and 32 will be greater, whereby the output of the differential amplifier 38 will remain constant. The steering control will not react and the vehicle will continue to wander to the left. Similarly as the car wanders to the right, the vehicle-steering mechanism will no react and the vehicle will continue to wander to the right. Means are provided to prevent such wandering of the vehicle 24. This means includes the two coils 26 and 28, the differential amplifier 34, a process amplifier 42′ and the steering mechanism 40. Since the two coils 26 and 28 cooperate with the guide line 10, the output of the differential amplifier 34 may be applied to a process amplifier 42′, whose output may be applied to the steering mechanism 40 to control the steering of the vehicle 24. The process amplifier provides a limiting action on the response of the mechanism 40 to the output of the amplifier 34 and thus keeps the control exercised by the guide wire 10 alone (that is without the turn wire 18) on the steering mechanism 40 to a few degrees. Thereby any residual wander of a vehicle 24 along a straight portion of the roadway 12 is corrected for.

Many modifications of the above-described guidance system will be apparent to a person skilled in the art. For example while a road way has been shown, the guidance system may be applied to airplane runways, to a waterway, or even to an unmarked path. Therefore, the description is to be taken as illustrative and not in a limiting sense.

I claim:

1. Apparatus for guiding a vehicle along a path, which comprises:

a first conductor extending along the path to be followed; and a second conductor situated along the path alongside the first conductor, the distances between said conductors varying in accordance with the curvature of the path so that in the portion of the path preceding a curve in one direction the distance between the conductors decreases and in the portion of the path preceding a curve in the opposite direction the distance between the conductors increases, the conductors being symmetrically disposed about the center line of the path in straight portions thereof and being asymmetrically disposed about said center line in portions of the path preceding a curve.

2. Apparatus according to claim 1, further comprising means for coupling a first signal having a given frequency to said first conductor and a second signal having another frequency to said second conductor.

3. Apparatus according to claim 2, further comprising means electromagnetically coupled to said conductors and responsive to said signals for steering the vehicle, said means operating to steer the vehicle in one direction when the distance between the conductors decreases and to steer the vehicle in the opposite direction when the distance between the conductors increases.